(12) United States Patent
Miura

(10) Patent No.: US 6,170,647 B1
(45) Date of Patent: Jan. 9, 2001

(54) CONVEYOR AND REFLOW DEVICE USING THE SAME

(75) Inventor: Takeo Miura, Kumamoto (JP)

(73) Assignee: NEC Corporation, Tokyo (JP)

( * ) Notice: Under 35 U.S.C. 154(b), the term of this patent shall be extended for 0 days.

(21) Appl. No.: 09/339,042

(22) Filed: Jun. 23, 1999

(30) Foreign Application Priority Data

Jun. 26, 1998 (JP) .................................................. 10-181132

(51) Int. Cl.⁷ .................................................. B65G 23/14
(52) U.S. Cl. .......................................... 198/833; 198/817
(58) Field of Search .................................. 198/604, 817, 198/833

(56) References Cited

U.S. PATENT DOCUMENTS

| | | | |
|---|---|---|---|
| 3,897,869 | * | 8/1975 | Michael ............................ 198/817 X |
| 4,917,233 | * | 4/1990 | Tsuda et al. .......................... 198/833 |
| 5,791,453 | * | 8/1998 | Schmits et al. .................. 198/817 X |
| 5,871,325 | * | 2/1999 | Schmidt et al. ................. 198/817 X |

FOREIGN PATENT DOCUMENTS

| | | |
|---|---|---|
| 60-43612 | 3/1985 | (JP) . |
| 6-255736 | 9/1994 | (JP) . |
| 9-159368 | 6/1997 | (JP) . |
| 87/05538 * | 9/1987 | (WO) ................................... 198/817 |

* cited by examiner

Primary Examiner—James R. Bidwell
(74) Attorney, Agent, or Firm—McGinn & Gibb, P.C.

(57) ABSTRACT

The present invention relates to a conveyer comprising: a pair of conveyer belts movable in the direction of transportation of an article by rollers; and a pair of article-supporting belts for supporting an article, the article-supporting belts being positioned between and interlocked with the conveyer belts, wherein upper portions of the conveyer belts are positioned above the article-supporting belts.

18 Claims, 3 Drawing Sheets

PRIOR ART
FIG.3
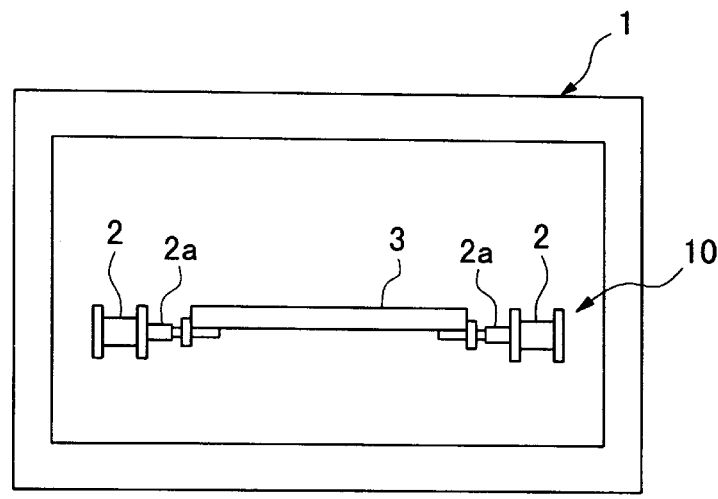
FIG.4a PRIOR ART
FIG.4b PRIOR ART
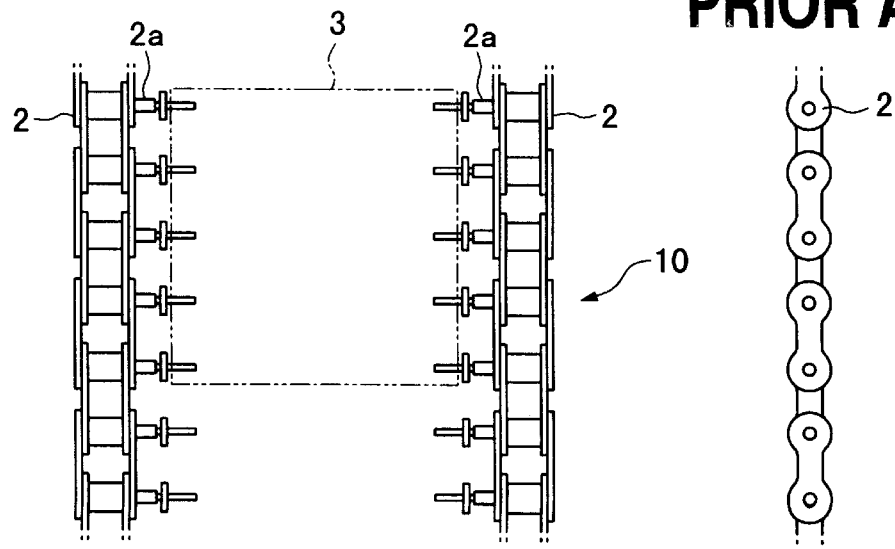

CONVEYOR AND REFLOW DEVICE USING THE SAME

BACKGROUND OF THE INVENTION

1. Field of the Invention

This invention relates to a conveyer and a reflow device using the same, for conveying a printed circuit board, a lead frame, or the like, and in particular, to a conveyer and a reflow device which prevents jamming or falling of an article to be conveyed by a pair of article-supporting belts provided between a pair of conveyer chain belts movable in the direction of transportation of the article by means of rollers.

This application is based on Japanese Patent Application No. Hei 10-181132, the contents of which are incorporated herein by reference.

2. Background Art including information disclosed under 37 CFR 1.97 and 1.98

As shown in FIGS. 3 and 4, a conventional reflow device has a reflow furnace 1, and a conveyer 10 for conveying a workpiece 3 through the reflow furnace 1. The workpiece 3 is a printed circuit board on which electronic parts are provided on copper foil pads (lands) provided with solder beforehand.

In general, the conveyer 10 employs a pair of chain belts (conveyer chain belts) to convey the workpiece 3. The chain belts are endless, and are rotated by driving rollers (not shown). From the joints of the chain belts 2, pins 2a for supporting the workpiece 3 protrude inwardly between the chain belts. This technique is disclosed in Japanese Unexamined Patent Applications, First Publications Nos. Hei 6-255736 and Hei 9-159368.

Further, Japanese Unexamined Utility Model Application, First Publication No. Sho 60-043612 discloses a conveyer which can adjust the interval between and the height of the chain belts according to the characteristics and size of the workpiece.

In the conventional reflow device, the workpiece 3 is supported on the pins 2a protruding from the conveyer chain belts 2, and, by rotating the conveyer chain belts in the same direction as each other with the roller, is transferred into the reflow furnace 1.

In the conventional reflow device, the pins 2a for supporting the workpiece to be conveyed are arranged separately (at even intervals). Therefore, when the workpiece 3 is conveyed by driving the rollers, the workpiece 3 may accidentally slide between, be jammed between, or fall from the pins 2a.

SUMMARY OF THE INVENTION

It is therefore an object of the present invention to provide a conveyer and a reflow device which prevents the article from jamming and falling.

In order to accomplish the above object, the conveyer of the present invention comprises: a pair of conveyer belts movable in the direction of transportation of an article by rollers; and a pair of article-supporting belts for supporting an article, the article-supporting belts being positioned between and interlocked with the conveyer belts, wherein upper portions of the conveyer belts are positioned above the article-supporting belts.

In the conveyer of the present invention, the article-supporting belts are attached to holder pins projecting from the joints of the conveyer belts. The conveyer belts and the article-supporting belts are chain belts. The conveyer belts and the article-supporting belts may be mesh belts.

In another aspect of the present invention, the conveyer of the present invention, further comprises: a first frame which is horizontally movable, one of the pairs of the conveyer belts and the article-supporting belts being supported by the first frame; and a second frame which is vertically movable, all the conveyer belts and the article-supporting belts being supported by the second frame.

Because the workpiece is supported by a pair of the article-supporting belts, the workpiece does not slide into the intervals between the pins of the belts. Further, because the article-supporting belts are considerably smaller than the conveyer belts, the vibration of the workpiece is decreased and jamming or falling of the workpiece is prevented. Furthermore, because the upper portion of the conveyer belts is positioned above the article-supporting belts, the conveyer belts work as side guides, preventing the workpiece from shifting, jamming, or falling.

In another aspect of the present invention, the reflow device of the present invention comprises: a pair of conveyer belts movable in a direction of transportation of an article by rollers; and a pair of article-supporting belts for supporting an article, the article-supporting belts being positioned between and interlocked with the conveyer belts, wherein upper portions of the conveyer belts are positioned above the article-supporting belts.

In the reflow device of the present invention, the article-supporting belts are attached to holder pins projecting from joints of the conveyer belts. The conveyer belts and the article-supporting belts are chain belts. The conveyer belts and the article-supporting belts may be mesh belts.

In another aspect of the present invention, the reflow device of the present invention, further comprises: a first frame which is horizontally movable, one of the pairs of the conveyer belts and the article-supporting belts being supported by the first frame; and a second frame which is vertically movable, all the conveyer belts and the article-supporting belts being supported by the second frame.

Because the workpiece is supported by the pair of article-supporting belts, the workpiece does not slide into the intervals between the pins of the belts. Further, because the article-supporting belts are considerably smaller than the conveyer belts, the vibration of the workpiece is decreased and jamming or falling of the workpiece is prevented. Furthermore, because the upper portion of the conveyer belts is positioned above the article-supporting belts, the conveyer belts work as side guides, preventing the workpiece from shifting, jamming, or falling.

BRIEF DESCRIPTION OF THE DRAWINGS

FIG. 2a is a top view of the conveyer of the present invention, and the FIG. 2b is a side view of the conveyer chain belts of the present invention.

FIG. 3 is a schematic cross-sectional diagram of the conventional reflow device.

FIGS. 4a and 4b are diagrams for explaining the conveyer of the conventional reflow device. FIG. 4a is a top view of the conventional conveyer, and the FIG. 4b is a side view of conveyer chain belts of the background art.

DETAILED DESCRIPTION OF THE PREFERRED EMBODIMENTS

Figure 1:
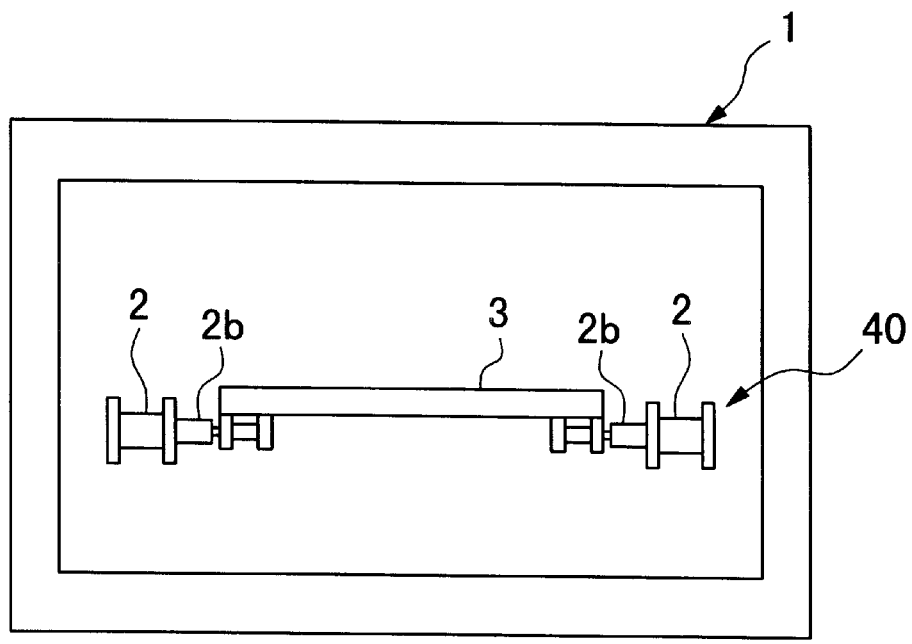
FIG. 1 is a schematic cross-sectional diagram showing the embodiment of the reflow device according to the present invention.
Figures 2A, 2B:
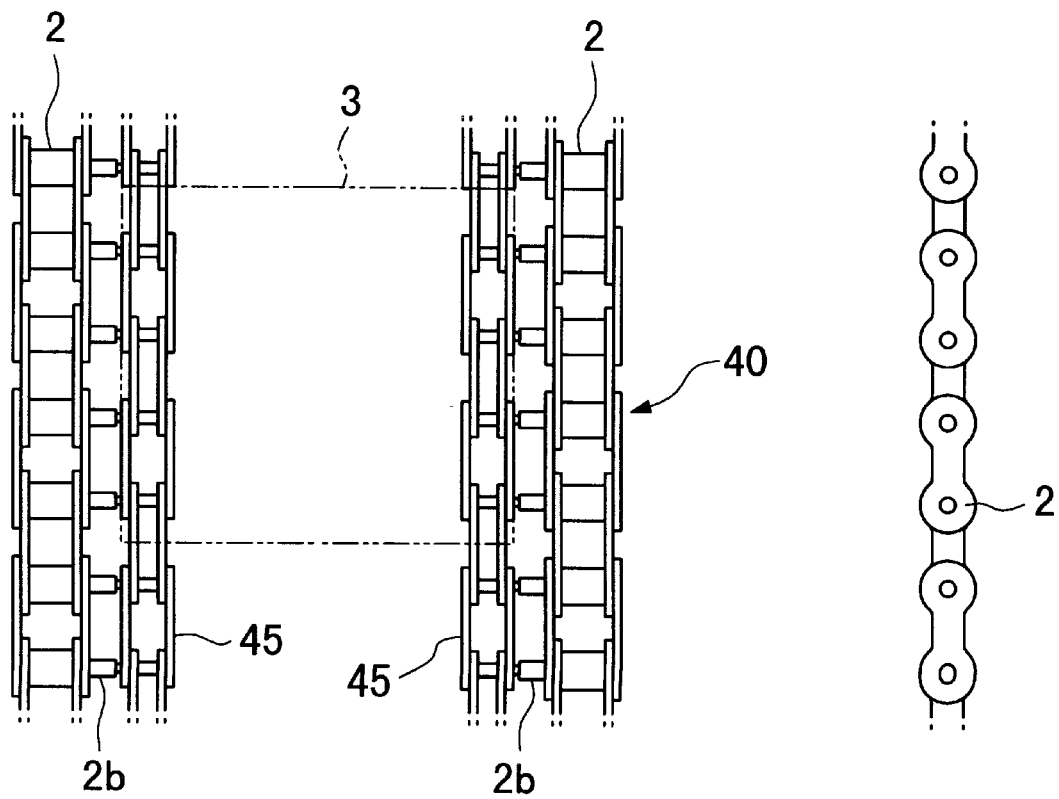
FIGS. 2a and 2b are diagrams explaining the conveyer of the reflow device of the present invention.

Referring to FIGS. 1 and 2, the best mode of the conveyer and the reflow device with the same according to the present invention will be explained.

Figure 5:
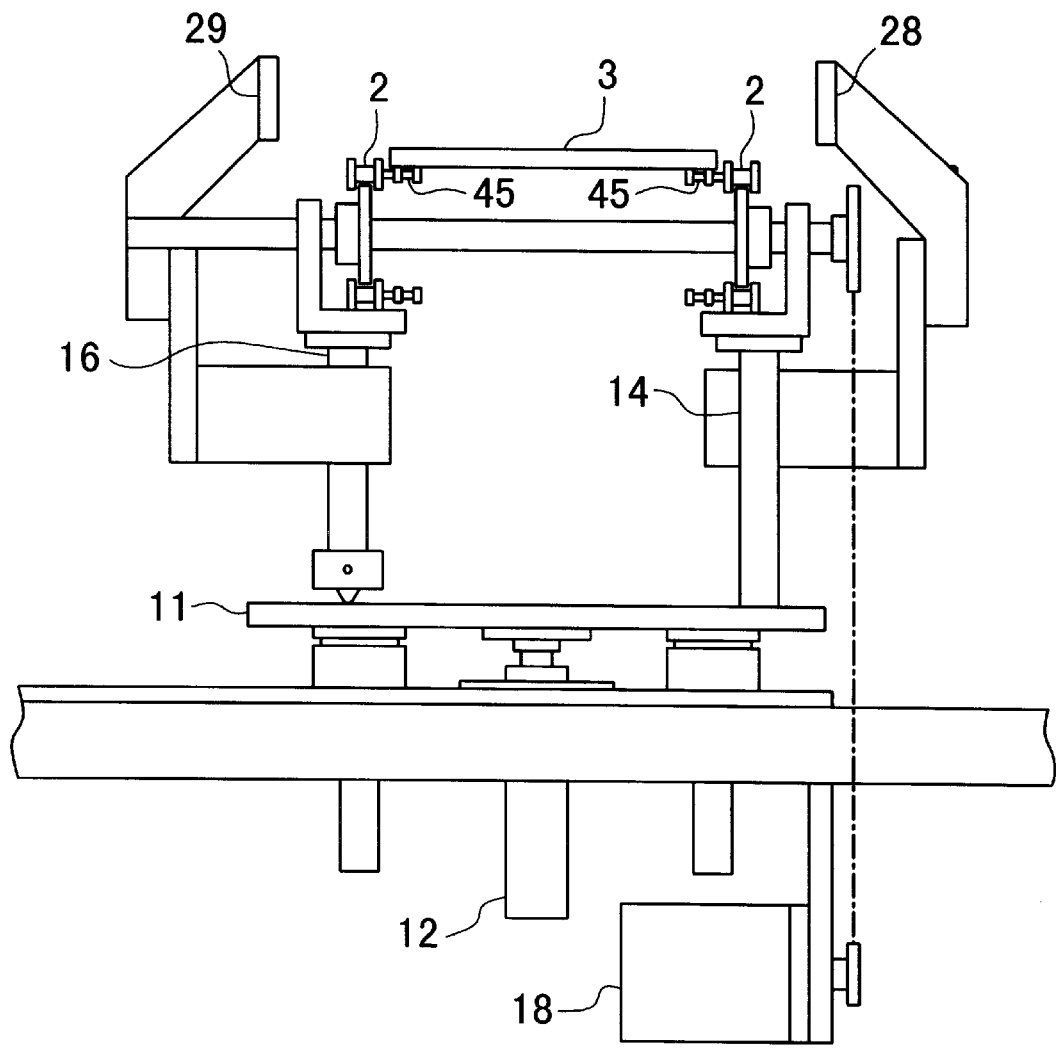
FIG. 5 is a front view of another embodiment of the reflow device of the present invention.

FIGS. 1 and 2 show the embodiment of the reflow device of the present invention. The difference between this reflow device and the conventional reflow device shown in FIGS. 3 to 5 is that, in a conveyer 40, a pair of conveyer chain belts 2 and a pair of article-supporting chain belts 45 for supporting an article to be conveyed are provided. The conveyer chain belts 2 are movable in the direction of transportation of a workpiece 3 which is the article to be transported, by driving rollers (not shown). The article-supporting chain belts 45 are provided between the conveyer chain belts 2, are also movable, and are interlocked with the conveyer chain belts 2.

The conveyer chain belts 2 and the article-supporting chain belts 45 may be endless belts.

The upper portions of the conveyer chain belts 2 are positioned above the article-supporting chain belts 45.

The article-supporting chain belts 45 are simply attached to holder pins 2b protruding from joints of the conveyer chain belts 2 so as to move synchronously with the conveyer chain belts 2.

Preferably, the chain portions of the article-supporting chain belts 45 are smaller than those of the conveyer chain belts 2.

The workpiece 3 to be conveyed is placed on the two article-supporting chain belts 45 between the conveyer chain belts 2. Then, by driving the roller to rotate the two conveyer chain belts 2 in the same direction, the workpiece 3 is conveyed through a reflow furnace.

The workpiece 3 is a printed circuit board or a lead frame on which electronic parts are provided beforehand onto copper foil pads (lands) with solder.

Depending on the structure for driving the conveyer chain belts 2 and the characteristics and size of the workpiece, the interval between and the height of the two conveyer chain belts 2 can be adjusted.

As described above, the reflow device has a pair of conveyer chain belts 2 movable in the direction of transportation of the workpiece 3 by means of the rollers, and a pair of article-supporting belts 45 positioned between and interlocked with the conveyer belts. The upper portions of the conveyer chain belts 2 are positioned above the article-supporting chain belts 45.

Because the workpiece 3 is supported by the pair of article-supporting chain belts 45, the workpiece 3 does not slide into the intervals between the pins of the belts. Further, because the article-supporting chain belts 45 are considerably smaller than the conveyer chain belts 2, the vibration of the workpiece 3 is decreased and jamming or falling of the workpiece 3 is prevented.

Furthermore, because the conveyer chain belts 2 are positioned above the article-supporting chain belts 45, the conveyer chain belts 2 work as side guides, preventing the workpiece 3 from shifting, jamming, or falling.

In this reflow device, a pair of conveyer mesh belts may be employed instead of the conveyer chain belts, and a pair of article-supporting mesh belts may be employed instead of the article-supporting chain belts. In this case, the reflow device yields the same effects as the embodiment.

FIG. 5 shows the reflow device of the second embodiment of the present invention which, depending on the structure for driving the conveyer chain belts 2 and the characteristics and size of the workpiece, can adjust the interval between and the height of the two conveyer chain belts 2. The reflow device has the article-supporting chain belts 45 in addition to the conveyer chain belts 2 as explained above. Further, one of the pairs of the conveyer chain belts 2 and the article-supporting chain belts 45 are attached to a horizontally movable frame 16. The other pairs of the conveyer chain belts 2 and the article-supporting chain belts 45 are supported by a fixed frame 14. By shifting the frame 16, the interval between the conveyer chain belts 45 can be changed. Further, the movable frame 16 and the fixed frame 14 are mounted on a vertically movable frame 11 driven by a drive unit 12. By driving the frame 11, the height of the chain belts 2 and 45 can be adjusted.

A drive motor 18 drives the conveyer chain belts 2 and the article-supporting chain belts 45 to transfer the workpiece 3. The workpiece 3, supported by the article-supporting chain belts 45, is guided by the conveyer chain belts 45 which are in contact with both edges of the workpiece 3. Further, side walls 28 and 29 prevent the workpiece 3 from falling off. On the upper sides of the article-supporting chain belts, means for prevent slipping may be provided.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A conveyer comprising:
    a pair of conveyer belts movable in a direction of transportation of an article by rollers; and
    a pair of article-supporting belts for supporting said article, said article-supporting belts being positioned between and interlocked with said conveyer belts,
    wherein upper portions of said conveyer belts are positioned above upper portions of said article-supporting belts,
    wherein said article-supporting belts have a dimension smaller than that of said conveyer belts.

2. A conveyer according to claim 1, wherein said article-supporting belts are attached to holder pins projecting from joints of said conveyer belts.

3. A conveyer according to claim 1, wherein said conveyer belts are chain belts, and said article-supporting belts are chain belts.

4. A conveyer according to claim 1, wherein said article-supporting belts are synchronously movable with said conveyer belts.

5. A conveyer according to claim 1, further comprising:
    a first frame which is horizontally movable, one of the pairs of said conveyer belts and said article-supporting belts being supported by said first frame;
    a second frame which is vertically movable, all said conveyer belts and said article-supporting belts being supported by said second frame; and
    a third frame which is fixed and supports the pairs of said conveyer belts and said article-supporting belts not supported by said first frame,
    wherein said first frame and said third frame are mounted on said second frame, wherein said first frame is moved to adjust the interval between outer portions of said article-supporting belts and inner portions of said conveyer belts, and wherein said second frame is moved to adjust the heights of said article-supporting belts and said conveyer belts.

6. A conveyer according to claim 1, wherein said conveyer is for conveying a printed circuit board or a lead frame.

7. A conveyer according to claim 1, wherein said dimension comprises a width dimension.

8. A conveyer according to claim 5, further comprising:
   side walls for containing said article on said article-supporting belts.

9. A conveyer according to claim 5, wherein said interval between said outer portions of said article-supporting belts and said inner portions of said conveyer belts, and the heights of said article-supporting belts and said conveyer belts are adjusted based on a characteristic of said article.

10. A reflow device comprising:
    a pair of conveyer belts movable in a direction of transportation of an article by rollers; and
    a pair of article-supporting belts for supporting said article, said article-supporting belts being positioned between and interlocked with said conveyor belts,
    wherein upper portions of said conveyer belts are positioned above upper portions of said article-supporting belts,
    wherein said article-supporting belts have a dimension smaller than that of said conveyer belts.

11. A reflow device according to claim 10, wherein said article-supporting [be]lts are attached to holder pins projecting from joints of said conveyer belts.

12. A reflow device according to claim 10, wherein said conveyer belts are chain belts, and said article-supporting belts are chain belts.

13. A reflow device according to claim 10, further comprising:

a first frame which is horizontally movable, one of the pairs of said conveyer belts and said article-supporting belts being supported by said first frame;

a second frame which is vertically movable, all said conveyer belts and said article-supporting belts being supported by said second frame; and a third frame which is fixed and supports the pairs of said conveyer belts and said article-supporting belts not supported by said first frame, wherein said first frame and said third frame are mounted on said second frame, wherein said first frame is moved to adjust the interval between outer portions of said article-supporting belts and inner portions of said conveyer belts, and wherein said second frame is moved to adjust the heights of said article-supporting belts and said conveyer belts.

14. A reflow device according to claim 13, further comprising:
    side walls for containing said article on said article supporting belts.

15. A reflow device according to claim 13, wherein said interval between said outer portions of said article-supporting belts and said inner portions of said conveyer belts, and the heights of said article-supporting belts and said conveyer belts are adjusted based on a characteristic of said article.

16. A reflow device according to claim 10, wherein said article-supporting belts are synchronously movable with said conveyer belts.

17. A reflow device according to claim 10, wherein said reflow device is for conveying a printed circuit board or a lead frame.

18. A reflow device according to claim 10, wherein said dimension comprises a width dimension.

* * * * *